United States Patent [19]

Beery et al.

[11] Patent Number: 4,954,297
[45] Date of Patent: Sep. 4, 1990

[54] METHOD AND APAPRATUS FOR FORMING A MATTE FINISH ON RESIN-COATED WEBS OR SHEETS

[75] Inventors: Jack Beery, Centerville; Charles W. Joiner, Jr., Dayton, both of Ohio

[73] Assignee: The Mead Corporation, Dayton, Ohio

[21] Appl. No.: 279,683

[22] Filed: Dec. 5, 1988

[51] Int. Cl.$^5$ .................. B29C 59/04; B29D 11/00
[52] U.S. Cl. ...................... 264/1.3; 264/1.9; 264/284; 425/364 R; 425/385
[58] Field of Search .............. 264/1.3, 284; 425/385, 425/364 R

[56] References Cited

U.S. PATENT DOCUMENTS

| | | |
|---|---|---|
| 3,541,216 | 11/1970 | Rochlis .................... 264/284 |
| 3,882,207 | 5/1975 | Hannan et al. ............... 264/284 |
| 3,959,546 | 5/1976 | Hill . | 
| 4,258,095 | 3/1981 | Larson et al. . |
| 4,601,861 | 7/1986 | Pricone et al. ............... 264/284 |
| 4,747,991 | 5/1988 | Bishop . |
| 4,761,311 | 8/1988 | Stone et al. . |

OTHER PUBLICATIONS

Webster's II, New Riverside University Dictionary, Riverside Publishing, 1984, p. 402.

*Primary Examiner*—James Lowe
*Attorney, Agent, or Firm*—Biebel, French & Nauman

[57] ABSTRACT

A glosser, and method of glossing, includes a belt-type glosser in which resin-coated web or sheet material is pressed or molded against a casting surface of the belt under heat and pressure, and is thereafter removed. A matte surface is provided by forming a non-locking grooved pattern on the casting surface of the belt in the form of a diffraction grating. The grating configuration is formed with a series of lands, separated by grooves or depressions, in which the side walls of the depressions are tapered to provide a valley narrower at the bottom than at the top adjacent the land surfaces so as to be free of resin-trapping overhanging projections or portions. The spacing between the grooves may be randomized.

2 Claims, 1 Drawing Sheet

METHOD AND APAPRATUS FOR FORMING A MATTE FINISH ON RESIN-COATED WEBS OR SHEETS

BACKGROUND OF THE INVENTION

This invention relates to apparatus and method of forming a matte finish on resin-coated webs or sheets, such as developer sheets used in conjunction with photosensitive imaging systems employing microcapsules to provide visible images upon contact with a color precursor. Such photosensitive imaging systems employing microencapsulated radiation sensitive compositions are the subject of commonly assigned U.S. Pat. Nos. 4,399,209, 4,416,966, and 4,440,846.

The imaging systems described in the aboveidentified patents are characterized by an imaging sheet including a layer of microcapsules which contain photosensitive composition in the internal phase which is image-wise exposed to actinic radiation. U.S. Pat. No. 4,399,209 discloses a transfer system in which the imaging sheet is assembled with a developer sheet prior to being subjected to a rupturing force. Upon passing through a pressure developer, the microcapsules rupture and image-wise release the internal phase whereupon the color precursor migrates to the developer sheet where it reacts with the dry developer and forms a color image.

Developer sheets or webs of such sheet material are provided with a resin on the surface which may be glossed by the application of heat and pressure, while supporting the sheet or web with the resin against a smooth or highly polished surface. The surface may be that of a heated convex plate, a roll, or a belt.

A belt-type glosser for applying a gloss finish to such developer sheets is described and claimed in the copending application of Stone et al, Ser. No. 017,102 filed Feb. 19, 1987, now Patent No. 4,761,311, and assigned to the same assignee as this invention, the disclosure of which is incorporated herein by reference. In the above-identified application, the polymer belt forms the glossing surface for the softening and finishing of the resin coating by the transfer of heat and pressure from a heated surface in running contact with the opposite side of the belt.

Typical thermoplastic developer resins which are capable of forming a film upon the application of heat and pressure are rather tacky compared to dry silver film, conventional film and xerographic copies. Thus, the release conditions of the developer sheet surface from the belt can be critical.

It is desirable to be able to provide a matte or textured finish to such developer web or sheet material, as may be preferred or desired. However, a conventional matte finish, formed in a belt or on a roll as a mirror image of a fine fabric woven or the like does not provide a satisfactory casting surface for the resin, in view of the strong tendency of the resin to adhere to such surface following the application of heat and pressure. This is due to the formation of mechanical locks between the resin and the surface.

SUMMARY OF THE INVENTION

This invention is directed to a method and apparatus for forming a matte surface on resin-coated developer sheets, of the character described above. The invention utilizes a grating formed in the casting surface, such as the surface of the belt, much like a diffraction grating used in optics. Such a grating is characterized by a series of lands in which each land is separated by a groove or depression, in which the sides of the depression are tapered so as to provide a valley which is narrower at the bottom than at the top adjacent the land surface, and is therefore free of any resin-trapping overhang portions. In other words, a draft is formed in the grating to allow separation, much like the draft in a plastic mold.

Such a grating can be manufactured as an integral part of a glossing belt and can have a density or spacing similar to that of an optical diffraction grating. The lines of the grating can run in the process direction or at an angle to the process direction. Randomization of the grating can be used to further enhance the matte appearance.

It is therefore an object of this invention to provide apparatus and method for forming a matte finish on a resin-coated web or paper material.

A further object of the invention is the provision of method and apparatus for the matte finishing of resin coated developer sheets by the formation of a lined configuration on a casting surface in the form of a grating, similar to a diffraction grating.

These and other objects and advantages of the invention are apparent from the following description, the accompanying drawings and the appended claims.

DESCRIPTION OF PREFERRED EMBODIMENT

Figure 1:
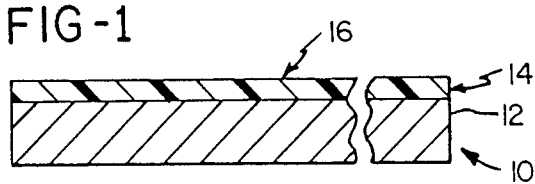
FIG. 1 is an enlarged fragmentary section through a resin coated developer sheet as used with this invention.

A developer sheet 10 useful in the practice of the present invention is shown in FIG. 1. The sheet 10 includes a support which is overcoated by a layer 14 of finely divided thermoplastic developer reins. Useful materials for the support 12 include both opaque substrates, such as paper, and transparent substrates such as polyethylene terephthalate film. Upon image-wise transfer of a color precursor to the surface of the sheet 10, a visible image surface 16 is formed in the layer 14, the image usually being the product of an acid-based reaction between the color precursor, which is usually an electron donor, and the thermoplastic developer resin, which is usually an electron acceptor.

Figure 2:
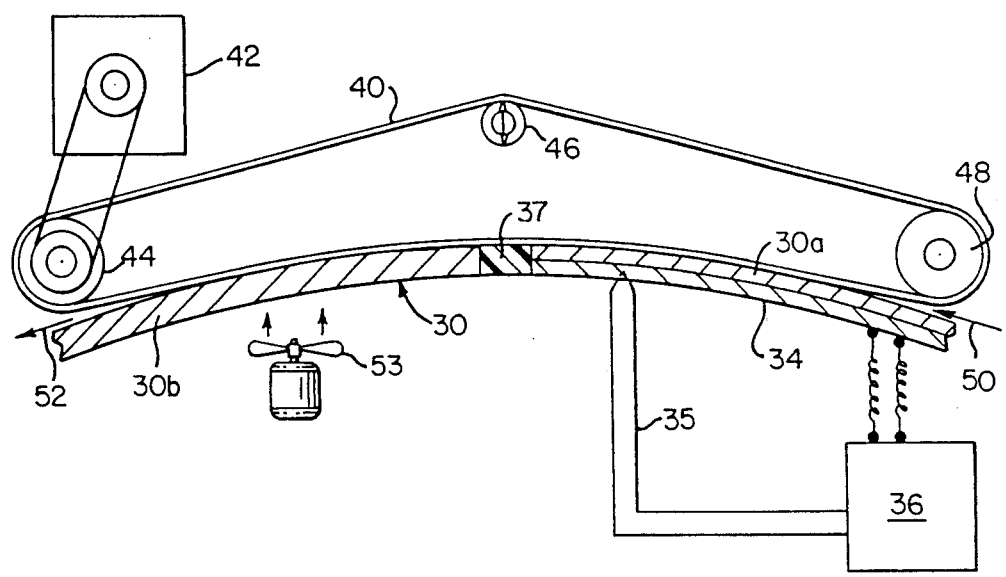
FIG. 2 is a partially schematic view of glossing apparatus useful in the practice of the present invention.

After developing the image 16, the developer sheet 10 is usually subject to glossing of the resin coating by casting or forming the same against the surface of a heated belt in a belt-type glosser, such as shown in FIG. 2. The thermoplastic developer resins 14 useful in the present invention typically have softening points ranging from about 100° C. to 200° C. The resin is cooled or chilled prior to separating the sheet 10 from the casting or molding surface.

As illustrated in FIG. 2, an arched plate 30 is gauged thin in order to provide a rapid temperature rise. Typically, the plate 30 has a thickness of 0.081 to 0.229 cm and is formed of metallic material, such as aluminum or stainless steel. The plate 30 may have a heat transfer limiting blanket 32 thereon, which limits the heat transfer rate from the plate 30 to the developer sheet 10.

An initial section 30a of the plate 30 may be heated by means of a heating pad 34, which may typically cover the lower surface of the plate section 30a. A thermocouple 35 typically monitors the temperature of the plate 30, and a temperature controller 36 maintains a desired temperature by controlling the wattage input to the heater 34. Accordingly, the plate section 3a may be heated to a temperature of about 105° to 125° C.

A second section 30b of the plate 30 comprises a cooling section. This section is separated from section 30a by a small thermal insulating block 37, forming a continuation of the plate 30 between the sections 30a and 30b.

The developer sheet 10 is fed between the convex side of the plate 30 and the adjacent outer surface of a continuous belt 40. The belt 40 is preferably a seamless polymer belt such as is commercially available from Textronics, Inc. under part No. 214-1969-01. A polytetrafluorethylene belt sold under the brand name "KAPTON" is commercially available from E. I. du Pont de Nemours & Company, Wilmington, Del. 19342, while a ethylene-propylene diene terpolymer is commercially available from The Goodyear Tire & Rubber Company, Akron, Ohio.

The belt 40 is held under tension and is trained over a drive roller 44, a tensioning roller 46, midway in the upper run of the belt, and an idler roller 48 so that the belt defines a lower run in pressure contact with the exposed upper surface of the plate 30. A motor 42 may drive the drive roller 44 through a suitable pulley arrangement, as shown.

Typically, the belt 40 is driven by the motor 42 from about 254 to 660 cm/min., and the lower run of the belt contacts the arched plate 30 for about 16 cm, with a dwell time of from about 1.4 to 3.8 seconds. The sheet 10 enters the space between the belt and the plate, as shown by the lead-in arrow 50 with the resin surface 14 facing upwardly in casting or molding relation to the exposed outer surface of the belt 40. The sheet leaves the glossing apparatus in the direction of the arrow 52. As the sheet enters in the direction 50 between the exposed outer surface of the belt 40 and the convex surface of the plate 30, the resin surface 14 is in contact with the belt surface and is heated by the plate section 30a. In this manner, the resin is cast onto the exposed surface of the belt and is subsequently cooled by the cooling section 30b. The cooling section 30b may be cooled in any conventional manner, such as by water jackets or by a cooling fan, as illustrated by the fan 53 in FIG. 2.

Figure 3:
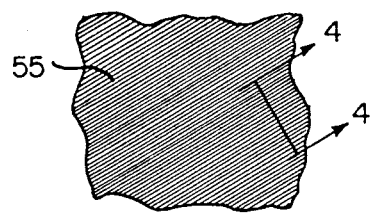
FIG. 3 is an enlarged fragmentary surface detail of the belt of FIG. 2.
Figure 4:
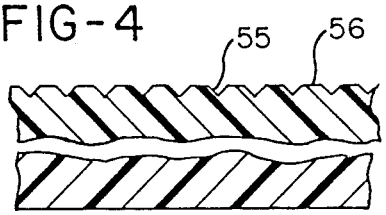
FIG. 4 is an enlarged fragmentary section showing the grooves formed by the diffraction grating for forming a matte surface, taken on line 4—4 of FIG. 3.

The outer surface of the belt 40 is formed with a finely divided surface groove configuration, as illustrated by the grooves 55 in FIG. 3 and 4. As previously noted, a matte finish on the resin coated developer sheets 10 is provided by forming a grooved surface, in the character of a diffraction grating, on the outer surface of the belt. This grating surface is characterized by a series of lands 56 separated by the grooves or depressions 55.

The grooves have a relatively high density, such as an approximately 2.0 micron pitch. The individual grooves 55 are characterized by a non-locking configuration which provides a draft like a plastic mold in that the grooves are wider at the top or at the land surface 56 than at the bottom.

Further, the grating may be configured in such a manner as to break up the reflective pattern. This may be accomplished by randomizing the grating, that is, by varying the spacing between the grooves in a random manner, to further enhance the matte appearance. The spacing between the grooves may be randomized between a range of about 1.6 to 2.6 microns in pitch, for example.

The grooves may be formed by a highly coherent and focussed beam, such as a laser beam. The surface configuration on the exposed or outer surface of the belt 14 may be formed from a master using well known techniques now employed in the manufacture of optical discs. Thus, a resist may be applied to a substrate, such as a glass plate, and laser exposed to the desired pattern and thereafter developed to provide the desired pattern of grooves. Metal, such as nickel or nickel alloy, may be plated on the developed surface to a suitable thickness and then lifted off from the surface to form a master grating.

In any configuration, it is important that the side walls of the depressions which define the grooves are tapered so as to provide a valley which is narrower at the groove bottom than at the top, so as to be free of resin-trapping overhang portions. In this manner, the sheet 10, after casting, readily releases from the belt surface with the desired matte configuration formed in the exposed resin surface 16 of the media material.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. The method of forming a matte finish on the resin surface only of resin coated web and paper material, comprising the steps of:

providing a resin casting surface in the form of a flexible endless belt, heating said belt to a temperature sufficient to coalesce said resin coating at said casting surface,:

applying the resin coated surface of such material against said casting surface in which said casting surface has a non-locking diffraction grating configuration formed with a series of lands separated by grooves, the sides of said grooves forming a valley which is narrower at the bottom than at the top adjacent the lands and free of resin-trapping overhang portions and in which the pitch of said grooves is randomized and is approximately between 1.6 and 2.6 microns, applying pressure to said material while so cast on said heated casting surface to coalesce the resin coating, cooling said belt to cool said material, and removing said cooled material from said casting surface.

2. In a belt-type glosser for applying a matte finish to resin-coated sheets by the application of heat and pressure to the resin coated surface of the sheet while it is molded against a casting surface of heated flexible endless belt, the improvement comprising:

means on said belt casting surface defining a grooved pattern in the form of a diffraction grating, in which a plurality of closely spaced individual grooves in the belt surface are configured with walls which are narrower at the bottoms of the grooves than at the tops thereof to provide a non-locking matte surface configuration on the resin surface only of said sheets, said grooves having a randomized pitch of between 1.6 to 2.6 microns.

* * * * *